Feb. 27, 1962     E. M. JONES     3,023,406
OPTICAL ENCODER
Filed April 29, 1957     7 Sheets-Sheet 1
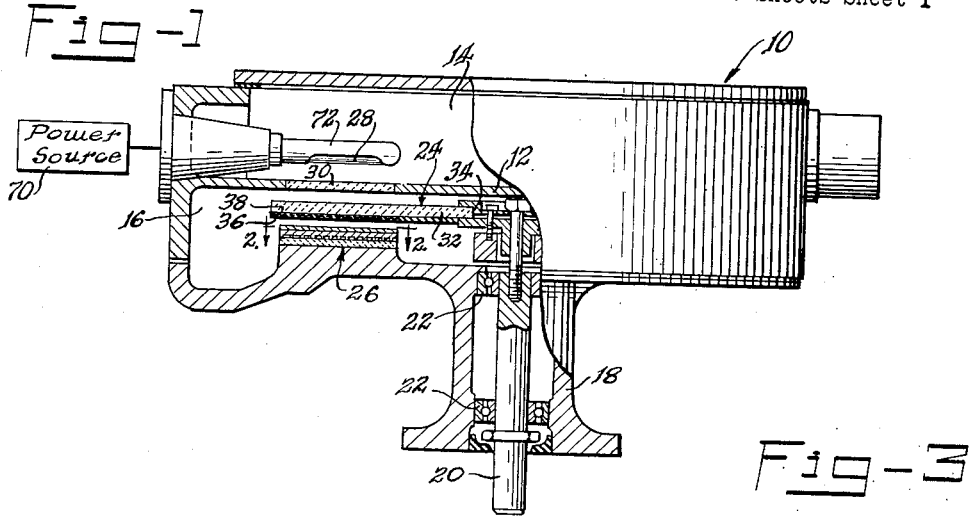
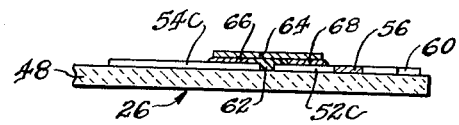
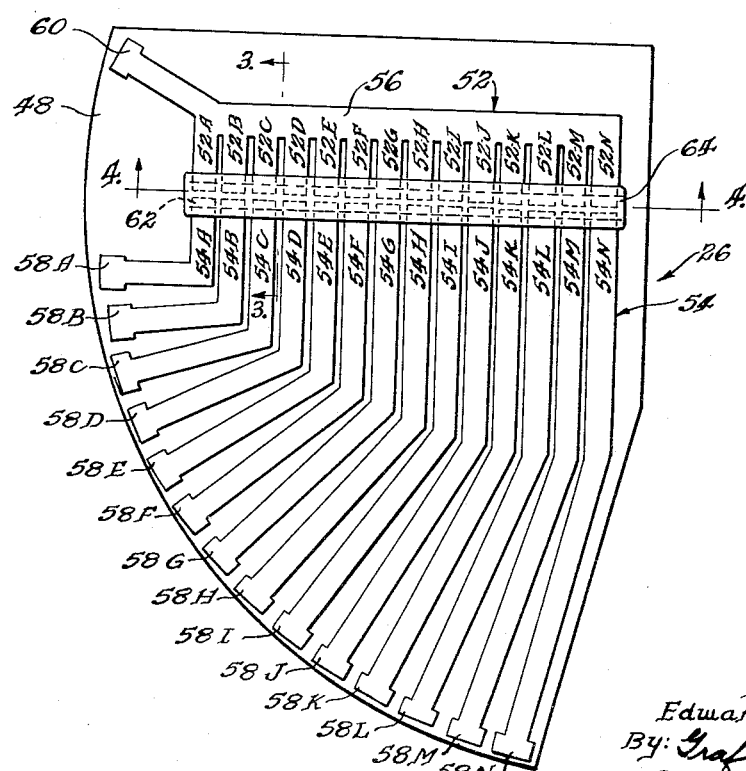
Inventor
Edward M. Jones
By: Graf, Nierman
& Burmeister
Attorneys

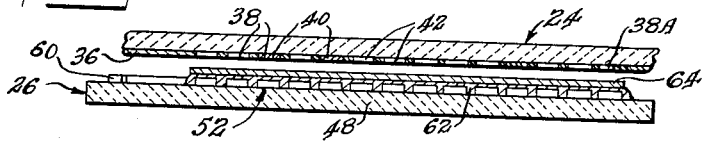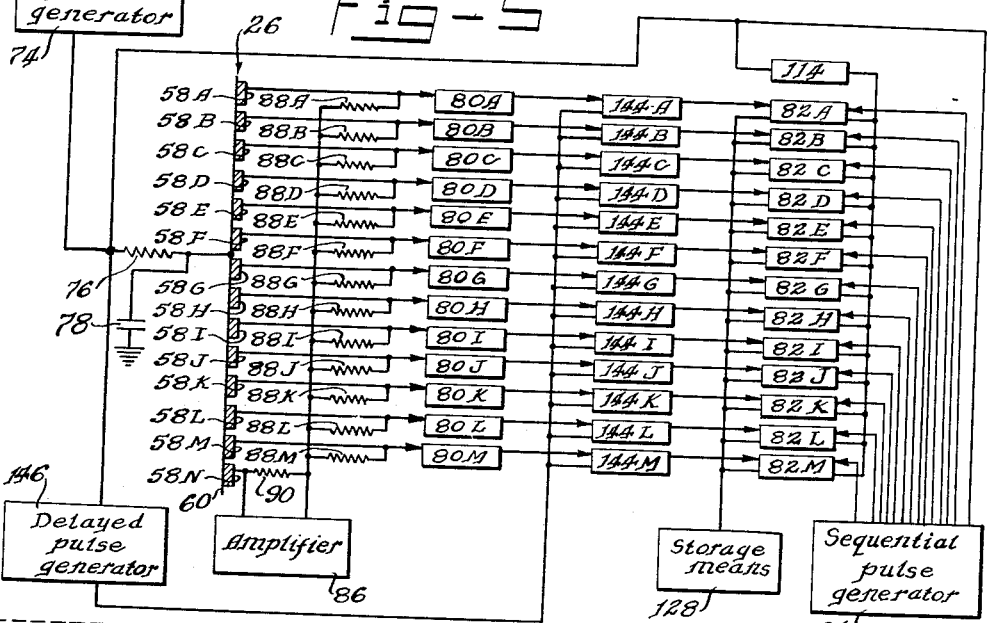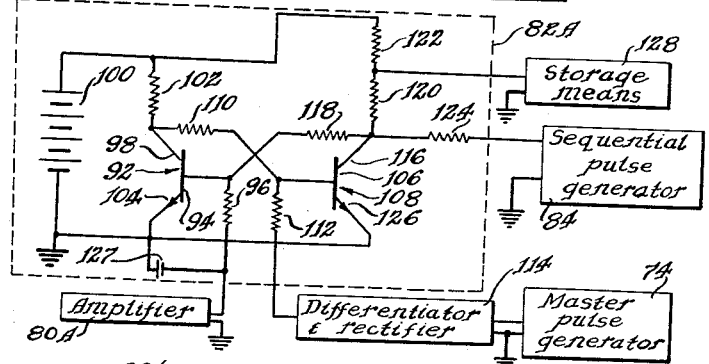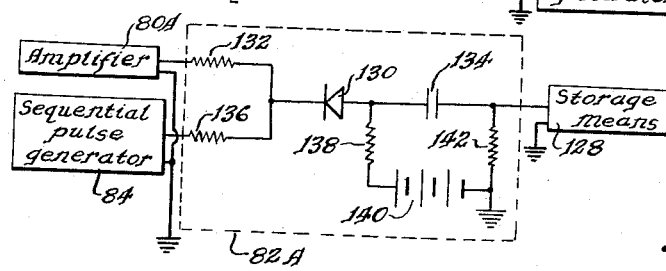

Feb. 27, 1962 E. M. JONES 3,023,406
OPTICAL ENCODER
Filed April 29, 1957 7 Sheets-Sheet 3
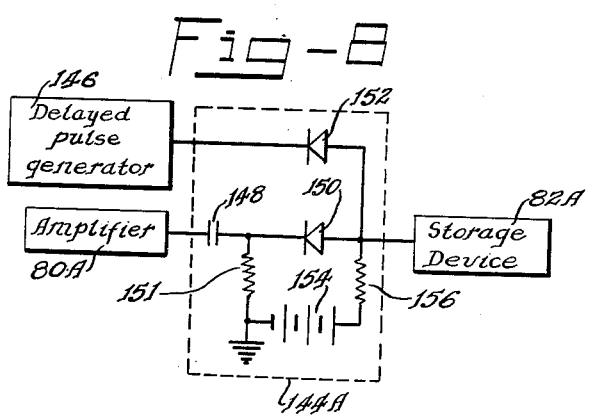
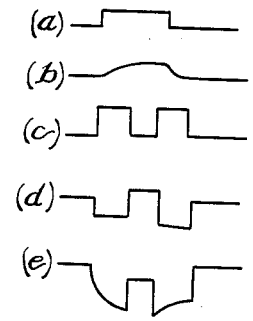
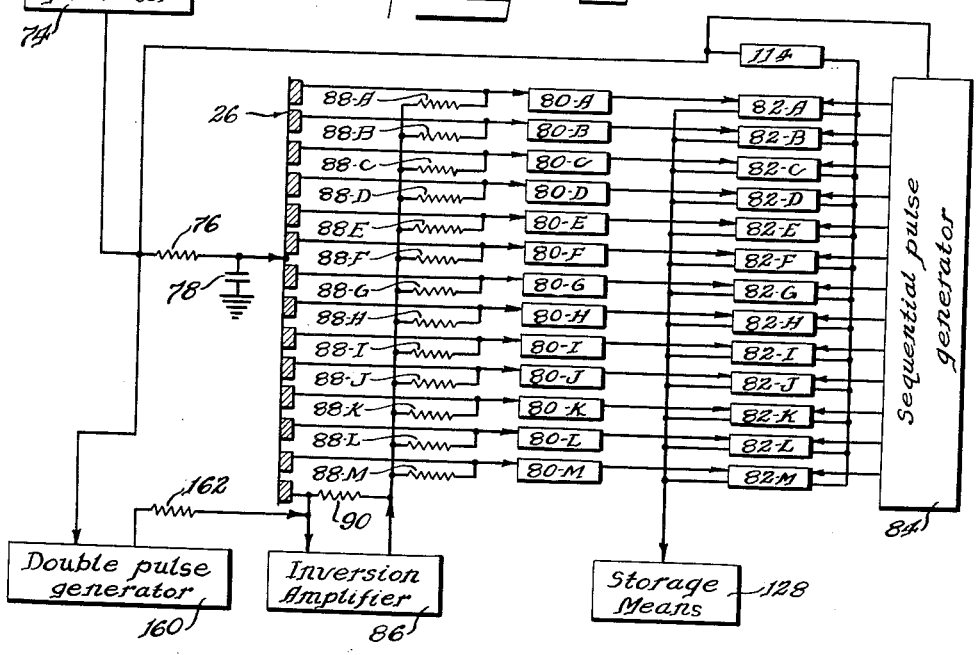
Inventor
Edward M. Jones
By:
Graf, Nierman, Burmeister
Attorneys

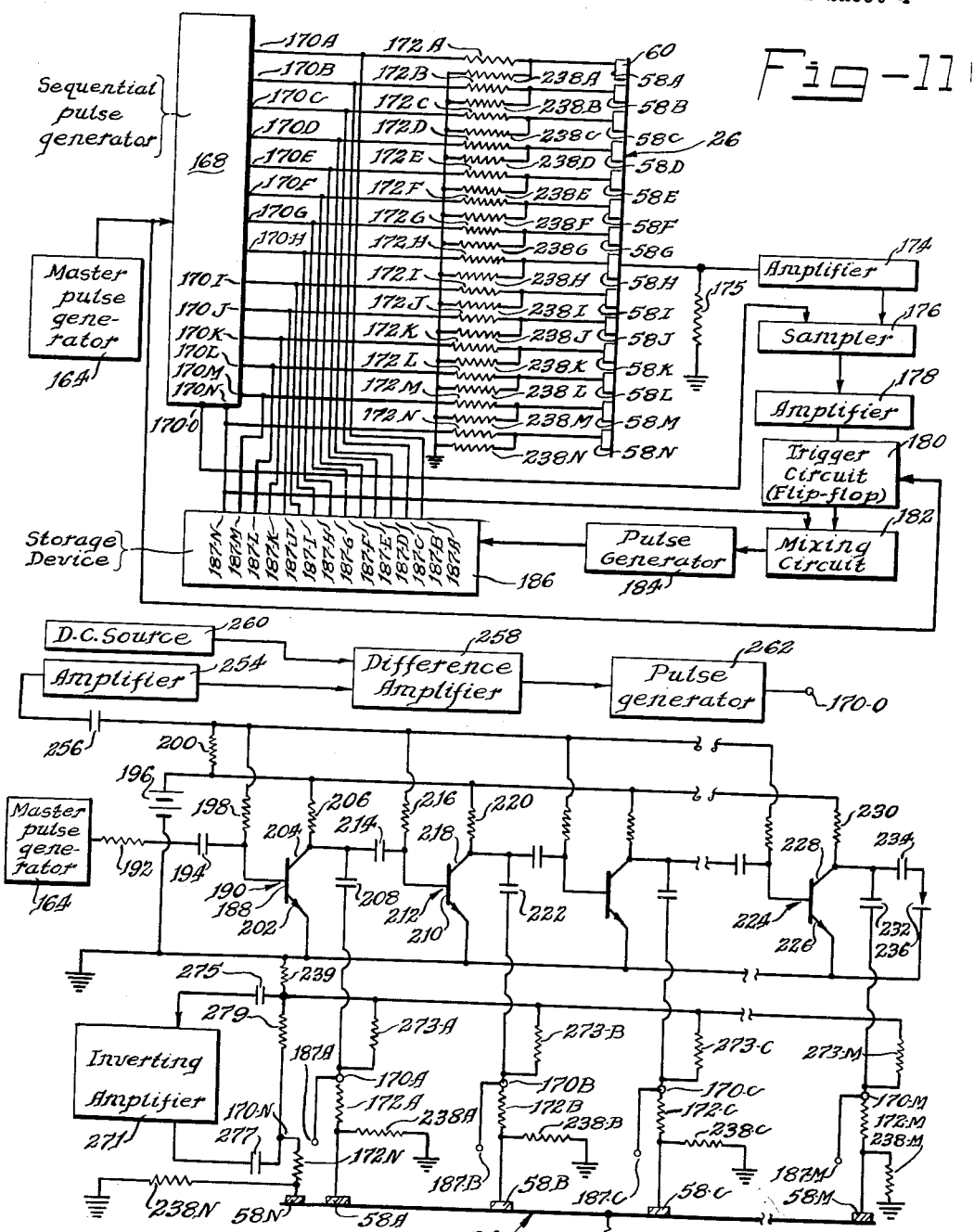

Feb. 27, 1962 E. M. JONES 3,023,406
OPTICAL ENCODER
Filed April 29, 1957 7 Sheets-Sheet 5
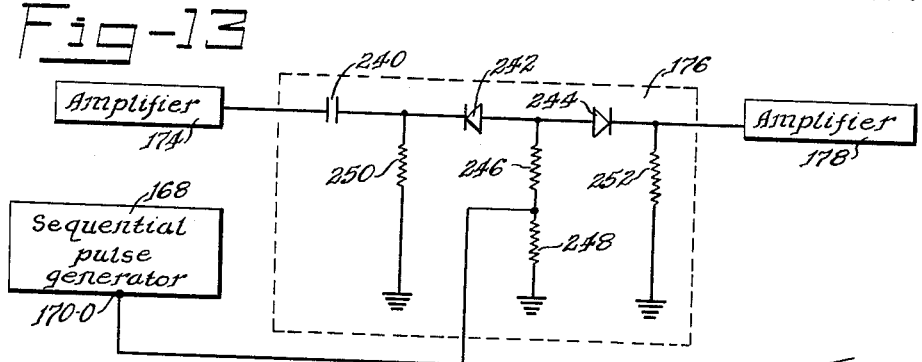
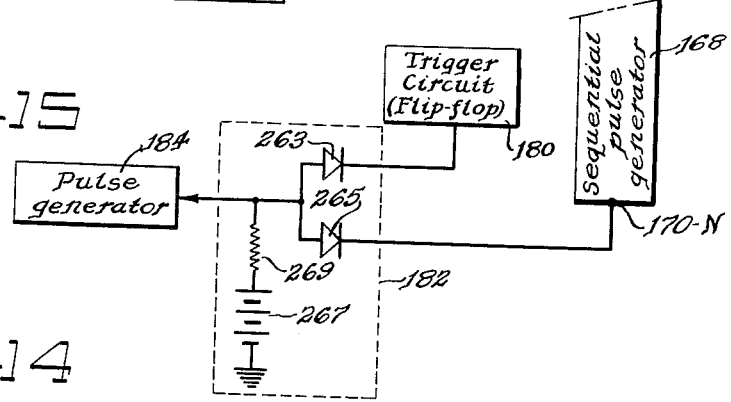
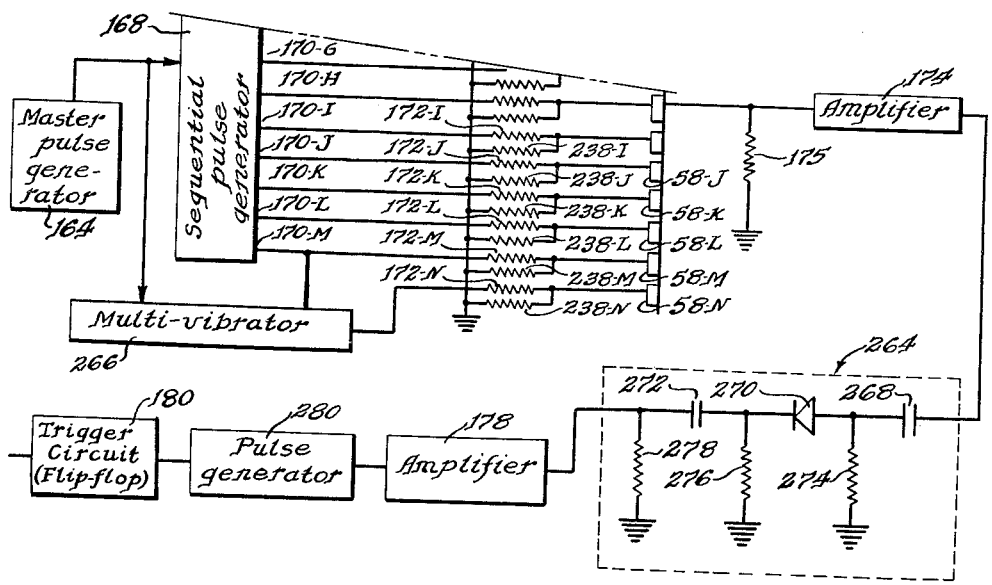
Inventor
Edward M. Jones
By:
Graf, Nierman Burmeister
Attorneys Inventor
Edward M. Jones
By:
Graf, Nierman & Burmeister
Attorneys

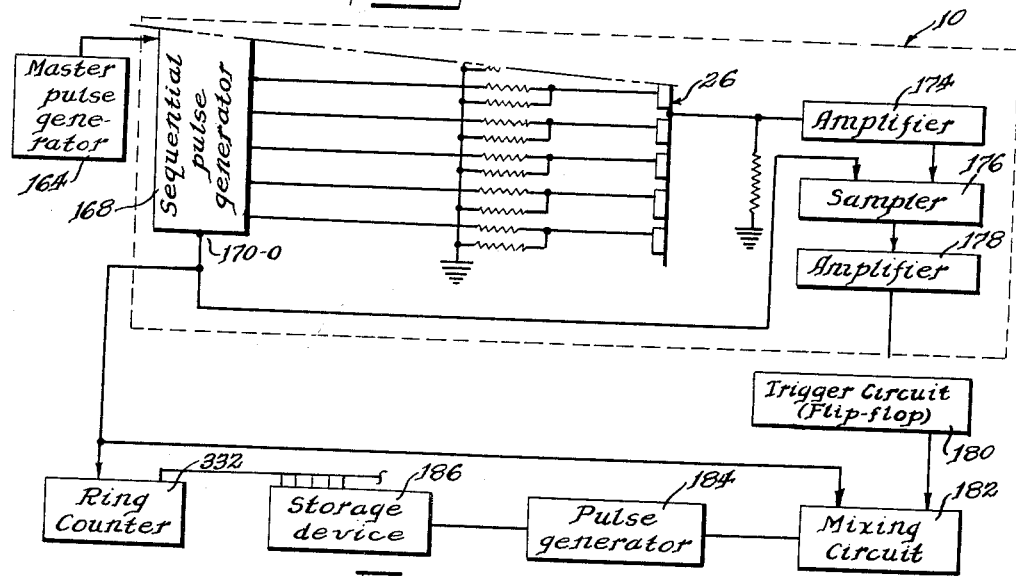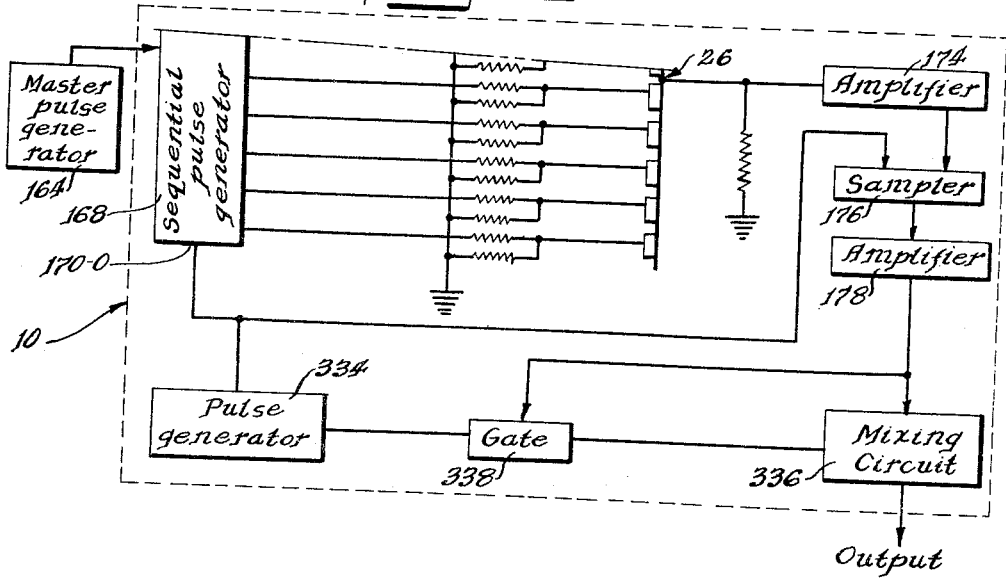

United States Patent Office
3,023,406
Patented Feb. 27, 1962

3,023,406
OPTICAL ENCODER
Edward M. Jones, Cincinnati, Ohio, assignor to The Baldwin Piano Company, Cincinnati, Ohio, a corporation of Ohio
Filed Apr. 29, 1957, Ser. No. 655,653
29 Claims. (Cl. 340—347)

The present invention relates generally to optical encoders, and particularly to sampling systems for optical encoders.

Optical encoders are commonly used to transform analogue information to digital form. Generally, optical encoders employ a code disc mounted to a rotatable shaft, and the analogue information is impressed upon the rotatable shaft. The code disc is provided with one or more annular tracks of opaque and transparent segments coaxially disposed about the center of the code disc. A lamp is disposed adjacent to one side of the code disc, and an assembly of photocells confronts the opposite side of the code disc.

An optical encoder must be provided with some means for obtaining the electrical output from the photocells only at the desired time intervals, this process being referred to as "sampling" of the code disc. In the past, sampling has been achieved by flashing the lamp during the time interval that an electrical response was to be utilized from the photocells and maintaining the lamp in extinguished condition during all other periods. This system of sampling places stringent requirements upon the light source.

The electrical response of a photocell is a function not only of the intensity of the light impinging thereon, but also of the wave length of the impinging light rays. As a result, the light source must produce intense radiation of the proper wave length for the photocells which may be instantly brought to full brilliance and quenched completely after a short duration. Ionization type lamps have been employed in the past and are excited by a pulse of several kilovolts to produce intense illumination for a short interval. However, such light sources have required frequent lamp replacement.

It is therefore one of the objects of the present invention to provide an optical encoder with a light source, a code disc, and a plurality of photocells which does not require flashing of the light source to achieve sampling of the code disc.

According to the teachings of the present invention, sampling is achieved by interrogating the photocells while maintaining constant illumination. It is thus a further object of the present invention to provide an optical encoder having a constant light source, a code disc, a plurality of photocells, and means for interrogating the photocells to obtain an electrical response therefrom only during the period of sampling.

It is desirable under some circumstances to sample all of the photocells at the same time. It is therefore a further object of the present invention to provide an optical encoder employing a constant light source and a plurality of photocells having means for sampling the photocells simultaneously.

Under other circumstances, it is desirable to sample the photocells in sequence. It is thus an additional object of the present invention to provide an optical encoder having a constant light source and means for sequentially sampling the photocells.

A further object of the present invention is to provide an optical encoder employing a constant light source and a plurality of photocells including means for producing an electrical signal from the photocells essentially independent of variations in illumination from the light source throughout the range of operation of the encoder.

It is also an object of the present invention to provide an optical encoder with a plurality of light responsive cells having a first value of interelectrode impedance when illuminated and a second value of interelectrode impedance when not illuminated, and means for periodically sampling the interelectrode impedance of each of the cells by activating the cells periodically and sampling the cells over a short period of time during the activation period.

These and additional objects of the present invention will become readily apparent upon further reading of this disclosure, particularly when viewed in the light of the drawings, in which:

FIGURE 1 is an elevational view, partly in section, of an encoder constructed according to the teachings of the present invention;

FIGURE 2 is a sectional view taken along the line 2—2 of FIGURE 1;

FIGURE 3 is a fragmentary sectional view taken along the line 3—3 of FIGURE 2;

FIGURE 4 is a sectional view taken along the line 4—4 of FIGURE 2;

FIGURE 5 is a schematic electrical circuit diagram illustrating means for simultaneously interrogating the photocells of the encoder illustrated in FIGURES 1 through 4;

FIGURE 6 is a schematic electrical circuit diagram of one of the storage means illustrated in FIGURE 5;

FIGURE 7 is a schematic electrical circuit diagram illustrating an alternate storage means which may be employed for each of the storage means illustrated in FIGURE 5;

FIGURE 8 is a schematic electrical circuit diagram of one of the gate circuits illustrated in FIGURE 5;

FIGURE 9 is a schematic electrical circuit diagram of a second means for simultaneously interrogating the photocells of the optical encoder;

FIGURE 10 illustrates the wave patterns which occur at several points of the electrical circuit illustrated in FIGURE 9;

FIGURE 11 is a schematic electrical circuit diagram of a means for sequentially interrogating the photocells of the optical encoder illustrated in FIGURES 1 through 4;

FIGURE 12 is a schematic electrical circuit diagram of a sequential pulse generator for use in the means for sequentially interrogating the photocells illustrated in FIGURE 11 and the means for simultaneously interrogating the photocells illustrated in FIGURES 5 and 9;

FIGURE 13 is a schematic electrical circuit diagram of the sampling circuit shown in FIGURE 11;

FIGURE 14 is a schematic electrical circuit diagram of an alternate sampling circuit to that shown in FIGURE 13;

FIGURE 15 is an electrical circuit diagram of the mixing circuit illustrated in FIGURE 11;

FIGURES 17, 18 and 19 are modifications of the encoder illustrated diagrammatically in FIGURE 11.

Figure 16:
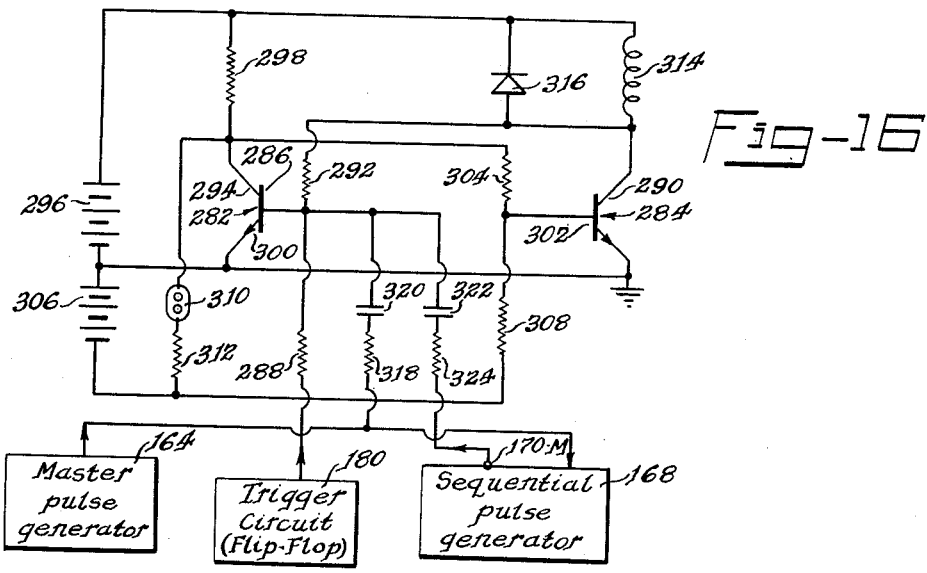
FIGURE 16 is a schematic electrical circuit diagram of a storage device for an alternate sequential interrogation means.

Referring to FIGURE 1, the optical encoder employs a housing 10 which is cylindrical in shape and has a partition 12 extending therethrough dividing the housing into two compartments 14 and 16. An axial hub 18 extends outwardly from the compartment 16 and a shaft 20 protrudes from the hub. The shaft 20 is journaled in bearings 22 mounted within the hub 18, and the code disc 24 is secured to the shaft 20 and rotatable therewith within the compartment 16. A plurality of spaced aligned cells or photocells constructed in a single assembly 26 are mounted closely adjacent to the code disc 24 on the side thereof opposite to the partition 12. A lamp 28 is mounted in the compartment 14 aligned with the window 30 in the partition 12 and the photocell assembly 26. The housing 10 is a dust tight unit.

The code disc 24 is constructed with a transparent base 32 which is provided with an axial aperture 34, and the base 32 is secured to the end of the shaft 20 at its aperture. The base 32 may be constructed of any transparent material of suitable mechanical properties, and glass has been found to be particularly suitable. The surface of the base 32 confronting the photocell assembly 26 has a coating 36 of opaque material, and fourteen annular tracks 38 formed of opaque sectors 40 and transparent sectors 42 are disposed in the coating 36 coaxially about the shaft 20, as illustrated in FIGURE 4.

The photocell assembly 26 is illustrated in detail in FIGURES 2, 3 and 4, and includes a plate 48 of electrically insulating material, in the particular construction glass, secured to the housing 10 of the encoder. A first group 52 of electrodes 52A, 52B, 52C, 52D, 52E, 52F, 52G, 52H, 52I, 52J, 52K, 52L, 52M, and 52N, confront a second group 54 of electrodes 54A, 54B, 54C, 54D, 54E, 54F, 54G, 54H, 54I, 54J, 54K, 54L, 54M, and 54N, the two groups of electrodes confronting each other on opposite sides of a common axis. The electrodes are constructed of electrically conducting material, and in one particular construction of the invention are formed by evaporating and subsequently etching Inconel on the glass plate 48. The electrodes 52 extend outwardly from a common strip portion 56, and are thus constructed as an integral unit. The electrodes 54, however, are each individual elements and extend away from the electrodes 52 to expanded portions adjacent to the periphery of the plate 48 which serve as terminals, designated 58A, 58B, 58C, 58D, 58E, 58F, 58G, 58H, 58I, 58J, 58K, 58L, 58M, and 58N. The plate 4 is fabricated in the form of a sector of a circle having a radius approximately equal to that of the code disc 24 in order to place all of the terminals in a region adjacent to the periphery of the code disc, thus facilitating electrical connections to the photocells. The strip portion 56 of the electrodes 52 has an outwardly flaring portion adjacent to the periphery of the plate 48 forming a terminal 60 which is common to the electrodes 52.

A mass or layer of photoconductive material 62 is disposed on the surface of the plate 48 and extends in the form of a ribbon across the two groups 52 and 54 of electrodes filling the region between the confronting ends of the two groups of electrodes. The most suitable materials for the photoconductive ribbon 62 have been found to be of the photoconductive semiconductor class. Cadmium selenide has been found to produce the fastest light response thus far, and cadmium sulfide, lead sulfide and lead selenide have also been found to be particularly suitable. Other suitable photoconductive materials for the layer 62 are ZnSe, ZnS, ZnTe, CdTe, germanium, silicon, and PbTe.

The sensitive regions of the photocell assembly 26 are the regions between the confronting pairs of electrodes, such as the region between the electrodes 52A and 54A. These regions are disposed confronting one of the tracks 38 of the code disc 24; for example, the outermost track of the code disc 24 is confronted by the region between the electrodes 52A and 54A, and the innermost track of the code disc is confronted by the region between the electrodes 52N and 54N. The cell, or photocell, will only produce a response when light impinges upon the sensitive region thereof, and this will only occur when a transparent sector of the track 38 of the code disc 24 is disposed between the sensitive region of a given photocell and the light source 28.

It is to be noted that the photoconductive layer or ribbon 62 extends between adjacent electrodes of each group. This, however, does not create coupling between adjacent electrodes of each group because of the fact that the regions between adjacent electrodes are maintained dark by the opaque coating 36 of the code disc 24 between the adjacent tracks 38. As a result, the electrical resistance of the layer 62 of photoconductive material remains high in these regions.

The sensitive regions of the photocells are hermetically sealed by a transparent strip 64 which is secured to the electrodes 52 and 54 and the plate 48 by a pair of strips 66 and 68 of cement disposed on opposite sides of the ribbon 62 of photoconductive material. A particularly suitable material for the strip 64 has been found to be glass having a thickness between 1 and 3 mils.

In order to eliminate the conventional radial-defining slit disposed between the code disc 24 and the photocell assembly 26, it is necessary that the spaces between the confronting groups of electrodes be less than the length of the smallest sector of the confronting code tracks. In order to obtain a high light to dark ratio from the photocells, that is, a large electrical response to illumination relative to the dark condition, it is necessary that the space between confronting electrodes and photocells be less than the arc length of the shortest sector of the track on the code disc 24. By limiting the space between confronting electrodes in the photocell assembly 26 to less than the arc length of the shortest sector of the confronting track of the code disc, the sensitive area of the photocell is limited to eliminate the necessity of a radial-defining slit. In order to achieve high accuracy, it is necessary to position the photocell assembly as close to the code disc 24 as possible.

In the preferred construction described herein, the distance between the photocell assembly 26 and the code disc 24 is approximately 0.003 inch. This small spacing is maintained in close tolerance to reduce errors caused by spreading of the light after passing through the code disc 24. The two groups of electrodes 52 and 54 are maintained at a spacing of approximately 8 microns. With cadmium selenide as the coating material 62, 65% of the current rise or decay is accomplished in 100 microseconds or less.

Even though the present encoder is illustrated as employing a code disc adapted to rotate in response to the device to be coded, the invention may also be practiced with other types of movement of the coding member, such as rectilinear. Further, the photocell assembly 26 is illustrated as normal to the tracks of the code disc 24, however, for some applications, it may be desirable to have the photocells aligned at an angle relative to the tracks of the coding member.

As stated above, a source 70 of power is connected to the lamp 28 to provide constant illumination from the lamp 28. A mirror 72 is disposed on the side of the lamp remote from the photocell assembly 26 to direct the illumination from the lamp 28 on the code disc 24 and the photocell assembly 26. The mirror has no important optical effect except to make the assembly more compact than a system using direct illumination of the disc. As stated above, interrogation of the photocells in the photocell assembly 26 is achieved by electrical pulsing of the photocells, and this interrogation may be achieved either by simultaneously pulsing the photocells, or sequentially pulsing the photocells. FIGURE 5 illustrates a system for simultaneous pulsing of the photocells.

In FIGURE 5, the photocell assembly 26 is illustrated schematically, and the common terminal 60 of the photocell assembly 26 is connected to a master pulse generator 74 through a resistor 76. A capacitor 78 is also connected between the common terminal 60 of the photocell assembly 26 and a common ground connector for the device. The master pulse generator 74 generates essentially square wave pulses at a constant frequency, and the RC circuit composed of resistor 76 and capacitor 78 modify these square wave pulses to eliminate the steeply rising portions thereof.

The terminals 58A, 58B, 58C, 58D, 58E, 58F, 58G, 58H, 58I, 58J, 58K, 58L, 58M, and 58N, are connected to amplifiers 80A, 80B, 80C, 80D, 80E, 80F, 80G, 80H, 80I, 80J, 80K, 80L, and 80M, respectively. It is to be noted that the terminal of each photocell, with the exception of 58N, is connected to an amplifier, and this photocell is employed for light compensation.

The output of each of the amplifiers 80A, 80B, 80C, 80D, 80E, 80F, 80G, 80H, 80I, 80J, 80K, 80L, and 80M, is connected to the input of one of the storage devices 82A, 82B, 82C, 82D, 82E, 82F, 82G, 82H, 82I, 82J, 82K, 82L, and 82M, respectively. A sequential pulse generator 84 is also connected to the storage devices 82A, 82B, 82C, 82D, 82E, 82F, 82G, 82H, 82I, 82J, 82K, 82L, and 82M. These storage devices are fundamental to the simultaneous system, as will be described.

One of the problems involved in sampling by pulsing the photocells is compensating for changes in light intensity from the lamp 28 due to blackening or replacement of the lamp. For this purpose, one of the tracks of the code disc 24, designated 38A, is completely clear and has a width approximately one-half that of the other tracks 38 on the code disc 24. The photocell confronting this track 38A has terminals 58N and 60, and the terminal 58N is connected to an amplifier 86. The output of the amplifier 86 is connected to the input of the amplifiers 80A, 80B, 80C, 80D, 80E, 80F, 80G, 80H, 80I, 80J, 80K, 80L, and 80M, through load resistors 88A, 88B, 88C, 88D, 88E, 88F, 88G, 88H, 88I, 88J, 88K, 88L, and 88M, respectively, and a feed back resistor 90 is connected between the output and input of the amplifier 86.

The reference photocell, identified by the electrodes 52N and 54N and the terminals 58N and 60, has the same conduction and capacity characteristics as the other photocells in the photocell assembly 26. Means in the form of a narrower track 38A on the code disc 24 are employed to reduce the illumination to the reference photocell by a factor of 2. As a result, the electrical response of the reference photocell will be reduced from the illuminated response of any other photocell by approximately one-half of the difference between the electrical response in an illuminated condition and in a dark condition of that cell.

The electrical response of the photocells to illumination is positive, and the amplifier 86 is employed to invert the response of the reference photocell appearing on terminal 58N to a negative signal which is then impressed upon the inputs of all of the amplifiers 80A, 80B, 80C, 80D, 80E, 80F, 80G, 80H, 80I, 80J, 80K, 80L, and 80M, through the load resistors 88A, 88B, 88C, 88D, 88E, 88F, 88G, 88H, 88I, 88J, 88K, 88L, and 88M. In this manner, the signal from the reference photocell is subtracted from the signals from each of the other photocells. As a result, a positive signal is impressed upon the input of the amplifier from its associated photocell when its associated photocell is illuminated, and a negative signal is impressed upon the input of an amplifier when its associated photocell is in the dark. The resistor 90 forms a negative feedback loop for the inversion amplifier 86 for the purpose of stabilizing the ratio of the output voltage to the input current for the amplifier 86. In addition, the resistor 90 lowers the output impedance of the amplifier forming a low impedance path for the return of all of the load resistors 88A, 88B, 88C, 88D, 88E, 88F, 88G, 88H, 88I, 88J, 88K, 88L, and 88M.

It is clear that the magnitude of the output from the inversion amplifier 86 is a function of the electrical illumination of the reference photocell, and that the outputs of each of the other photocells is likewise a function of the illumination thereof, this output being developed across the load resistors 88A, 88B, 88C, 88D, 88E, 88F, 88G, 88H, 88I, 88J, 88K, 88L, and 88M. However, the voltage difference between the output of the inversion amplifier 86 and each of the other photocells, is independent of the magnitude of the illumination, other circuit parameters remaining constant. In this manner, the polarity of signals appearing in the output of the amplifiers 80A, 80B, 80C, 80D, 80E, 80F, 80G, 80H, 80I, 80J, 80K, 80L, and 80M, is unaffected by changes in the illumination of the photocell assembly 26.

The current through each illuminated photocell is the combination of the replica of the wave form impressed upon or across the photocell due to the illuminated resistance of the photocell and a replica of the derivative of the wave form impressed across the cell due to the interelectrode capacity of the photocell which is independent of light intensity. The current through a dark photocell is due to the derivative of the wave impressed upon the cell due to the interelectrode capacity of the photocell, since the resistance of the photocell is high in its dark condition. Since the reference photocell generates the derivative of the impressed wave in a form essentially identical to that of the other photocells, the effect of capacity currents from the photocells may be completely eliminated by properly proportioning the resistors 88A, 88B, 88C, 88D, 88E, 88F, 88G, 88H, 88I, 88J, 88K, 88L, and 88M, with the resistor 90. Further, this construction cancels the dark current of the photocell, since it is only the difference between the cell response and the output of the inversion amplifier 86 which is impressed upon the amplifiers.

The output of the amplifiers 80A, 80B, 80C, 80D, 80E, 80F, 80G, 80H, 80I, 80J, 80K, 80L, and 80M, is positive in response to illumination of the associated photocell. Thus, the storage means 82A, 82B, 82C, 82D, 82E, 82F, 82G, 82H, 82I, 82J, 82K, 82L, and 82M, must respond to relatively small positive pulses but not respond to negative pulses of very large magnitude. The gain of the amplifiers need not be very stable. A suitable storage device for the storage means 82A, 82B, 82C, 82D, 82E, 82F, 82G, 82H, 82I, 82J, 82K, 82L, and 82M, is illustrated in FIGURE 6, the storage device being illustrated as 82A.

Basically, this storage device is a bistable transistor multivibrator, and one such multivibrator is connected to the output of each of the amplifiers 80A, 80B, 80C, 80D, 80E, 80F, 80G, 80H, 80I, 80J, 80K, 80L, and 80M. A first transistor 92 has a base 94 which is connected to the output of one of the amplifiers through a resistor 96. The collector 98 of the transistor 92 is connected to the positive terminal of a power source 100 through a resistor 102, and the emitter 104 of the transistor 92 is connected directly to the negative terminal of the power source 100, here illustrated as a battery. The collector 98 of the transistor 92 is also connected to the base 106 of a second transistor 108 through a resistor 110, and the base 106 is connected to the master pulse generator 74 through a resistor 112 and differentiator and rectifier 114 connected in series. The transistor 108 has a collector 116 which is connected to the base 94 of the transistor 92 by a resistor 118, and to the positive terminal of the power source 100 by a pair of resistors 120 and 122 connected in series. The collector 116 is also connected to the sequential pulse generator 84 through a resistor 124. The emitter 126 of the transistor 108 is connected directly to the negative terminal of the power source 100 and to the common ground connector.

A bias source 127 is connected between the negative terminal of the power source 100 and the base 94 of the transistor 92, and the bias is adjusted to cause the transistor 92 to become conducting for small positive pulses impressed upon its base through the resistor 96. The transistor 92 will not cease conducting even in the presence of large negative pulses impressed upon its base 94 once it has commenced conducting. When the transistor 92 is conducting, the transistor 108 is cut off, and a sampling pulse from the sequential pulse generator 84 is readily conducted through the resistor 120 to a storage means 128. However, if the photocell associated with the particular storage means has not experienced illumination greater than 50%, the transistor 92 will be cut off and the transistor 108 will be conducting. A sampling pulse then from the sequential pulse generator 84 will be principally shorted across the transistor 108 due to its low collector impedance under conducting conditions.

The following pulse from the master pulse generator 74 is rectified and differentiated by the differentiator and rectifier 114 and impressed upon the base 106 of transistor 108. This positive pulse is effective to cause the transistor 108 to become conducting and to cut off the flow of current through the transistor 92, thus establishing proper conditions in the storage means for a new cycle.

Since there is a separate storage device associated with each photocell of the encoder, a thirteen digit encoder will require thirteen storage devices, as illustrated, although it is to be understood that the invention can be practiced with any number of photocells to produce any number of digits. However, the power source 100 and resistor 122 may be common to all of the storage devices, so that the encoder has a single output terminal at the junction of the resistors 120 and 122.

The storage device illustrated in FIGURE 6 is advantageous to the encoder because of the fact that sampling will produce standardized pulses and because of the fact that nearly all of the time is available for sampling. Further, if the means 128 is a convertor to straight code which does not involve sequential operations, the sequential pulse generator 84 may be omitted and the means 128 connected directly to the collectors of the transistors 108 of the storage means 82A, 82B, 82C, 82D, 82E, 82F, 82G, 82H, 82I, 82J, 82K, 82L, and 82M.

Another storage device suitable for use in the simultaneous encoder illustrated in FIGURE 5 is illustrated in FIGURE 7. This storage device is designated 82A and is illustrated connected to amplifier 80A, although it is understood that the output of each of the amplifiers 80A, 80B, 80C, 80D, 80E, 80F, 80G, 80H, 80I, 80J, 80K, 80L, and 80M, is connected to separate storage means, each including a diode 130 and a resistor 132 connected in series, and each of the diodes 130 is connected to the common storage means 128 through a capacitor 134. The sequential pulse generator 84 for sampling is also connected to the diode 130 through a resistor 136, the diode 130 being connected to pass negative charges from the input of the storage means and sequential pulse generator. The junction between the diode 130 and the capacitor 134 is maintained at a slightly positive potential relative to the common ground connector of the device by a resistor 138 and power source 140 connected in series, and the junction between the storage means 128 and the capacitor 134 is connected to the ground connector through a resistor 142.

Whenever the light intensity falling upon the photocell associated with a particular storage means is less than 50%, a negative pulse appears at the output of the amplifier for that channel, and this negative pulse charges capacitor 134. Resistor 138 is selected to discharge the capacitor 134 at a sufficiently slow rate that a sampling pulse from the sequential pulse generator 84 will occur prior to the discharge of the capacitor 134. The pulse from the sequential pulse generator 84 is positive, and this positive pulse fails to pass through the diode 130 to any appreciable extent because of the back impedance of the diode. On the other hand, when the photocell associated with the particular storage means is illuminated greater than 50%, a positive pulse appears at the input of the storage device which is prevented from passing to the capacitor 134 by the diode 130, thus maintaining the capacitor 134 slightly positive due to the charge flowing through resistor 138. Under these conditions, the reverse impedance of the diode 130 is relatively low, and the sampling pulse from the sequential pulse generator 84 passes through the diode 130 and capacitor 134 to the storage means 128. It is assumed that the internal impedance of the amplifiers 80A, 80B, 80C, 80D, 80E, 80F, 80G, 80H, 80I, 80J, 80K, 80L, or 80M, is very low and also that resistors 132 and 142 are low to permit the capacitor 134 to charge properly during the short pulse at the input of the storage device. Resistor 136 is larger than resistor 132 and resistor 142 is small, thus resulting in a sampling pulse which is greatly attenuated at the storage means 128. However, the resistor 142 may be common for all storage means 82A, 82B, 82C, 82D, 82E, 82F, 82G, 82H, 82I, 82J, 82K, 82L, and 82M, since capacitor 134 is essentially the output of the storage means, thus permitting a single amplifier to be placed between capacitor 134 and the storage means 128.

Resistor 138 must be sufficiently large to prevent the capacitor 134 from discharging too rapidly but must accomplish the discharge of capacitor 134 by the time the next pulse from the master pulse generator 74 occurs. Further, by the use of resistor 138, the temperature characteristics of the diode 130 are essentially swamped out assuming the diode is a silicon junction type.

A photocell which is capacitively over-compensated under conditions of less than 50% illumination produces an initial prositive spike in response to a pulse from the master pulse generator 74 which tends to trigger the multivibrator type storage device 82A, 82B, 82C, 82D, 82E, 82F, 82G, 82H, 82I, 82J, 82K, 82L, and 82M (illustrated in FIGURE 6) even though the cell is not illuminated. Also, a negative spike is produced by a cell receiving less than 50% illumination in response to a pulse from the master generator 74 just prior to its decay, and this spike is sufficiently large under some circumstances to trigger a capacity storage device (illustrated in FIGURE 7). Even when the illumination of a photocell is greater than 50%, similar but opposite errors occur when there is over-compensation of the capacity of the photocell. For these reasons, a gate 144A is inserted between amplifier 80A and storage device 82A, and in like manner gates 144B, 144C, 144D, 144E, 144F, 144G, 144H, 144I, 144J, 144K, 144L, and 144M, are inserted between amplifiers 80B, 80C, 80D, 80E, 80F, 80G, 80H, 80I, 80J, 80K, 80L, and 80M, and storage devices 82B, 82C, 82D, 82E, 82F, 82G, 82H, 82I, 82J, 82K, 82L, and 82M, respectively. The gates 144A, 144B, 144C, 144D, 144E, 144F, 144G, 144H, 144I, 144J, 144K, 144L, and 144M, are simultaneously actuated by a delayed sampling pulse generator 146, and the sampling pulse generator 146 is actuated by pulses from the master pulse generator 74. The pulse produced by the delayed sampling pulse generator 146 is short relative to the pulse from the master pulse generator, and occurs during the period of the pulse from the master pulse generator 74. The time constant of resistor 76 and capacitor 78 is sufficiently short so that the capacitive transient from the photocells will have completely died out prior to the leading edge of the pulse from the delayed sampling pulse generator 146. In this manner, triggering as a result of spikes in the initial portion of the pulse from the amplifiers is eliminated. Further, the duration of the pulse from the sample pulse generator 146 is sufficiently short that the pulse has ceased slightly before the end of the master pulse, so the second transient from the photocells will not pass through the gates either.

FIGURE 8 illustrates a suitable gate for the gates 144A, 144B, 144C, 144D, 144E, 144F, 144G, 144H, 144I, 144J, 144K, 144L, and 144M. As illustrated in FIGURE 8, the gate is designated 144A and is shown connected between the amplifier 80A and the storage device 82A, although it is to be understood that identical gate circuits are employed between the other amplifiers and storage devices, and that the gate circuits are all connected to the output of the delayed pulse generator 146. A capacitor 148 and diode 150 are connected in series between the amplifier 80A and the storage means 82A, the diode 150 being oriented to pass negative charges from the amplifier 80A to the storage means 82A. A resistor 151 is connected between the common ground connector and the junction between capacitor 148 and diode 150. A second diode 152 is connected between the delayed pulse generator 146 and the junction between diode 150 and storage device 82A to pass negative charges from the delayed pulse generator to the storage device. Also, this junction point between the diode 150 and the storage device 82A is connected to the common ground connector by a battery 154 connected in series with a resistor 156.

Positive pulses from the amplifier 80A are required to trigger the storage device 82A, and these cannot pass through the diode 150. However, since the impedance of the delayed pulse generator 146 is low, relative to the resistance of resistor 156, the junction between diode 150 and the storage device 82A does not assume a positive potential in spite of the power source 154. When a positive pulse occurs from the delayed pulse generator 146 during the existence of a positive pulse from the amplifier 80A, the potential of the junction between diode 150 and the storage device 82A rises since positive charges can no longer flow through the diode 152 due to its increased impedance. In this manner, gating action is achieved.

The sequential pulse generator 84 produces a plurality of pulses between each pulse from the master pulse generator 74, only one of these pulses being impressed upon each of the storage devices. Further, the pulses produced by the sequential pulse generator occur after the lapse of a fixed time interval. A suitable sequential pulse generator is illustrated in FIGURE 12 and will be described hereinafter.

FIGURE 9 illustrates another device for sampling the storage means which does not require gate circuits between the amplifiers and the storage means. In the description of this device, elements which are identical to those described hereinbefore will bear the same designations. As is apparent from a comparison of FIGURE 9 with FIGURE 5, the encoder employs the master oscillator 74, photocell assembly 26, amplifiers 80A, 80B, 80C, 80D, 80E, 80F, 80G, 80H, 80I, 80J, 80K, 80L, and 80M, storage devices 82A, 82B, 82C, 82D, 82E, 82F, 82G, 82H, 82I, 82J, 82K, 82L, and 82M, sequential pulse generator 84, inversion amplifier 86, and storage means 128. However, in this embodiment, the storage means 82A, 82B, 82C, 82D, 82E, 82F, 82G, 82H, 82I, 82J, 82K, 82L, and 82M, are directly connected to the outputs of the amplifiers 80A, 80B, 80C, 80D, 80E, 80F, 80G, 80H, 80I, 80J, 80K, 80L, and 80M, and the gates 144 and delayed pulse generator 146 are omitted. A double pulse generator 160 is connected to the master pulse generator 74 and to the input of the inversion amplifier 86 through a resistor 162. The double pulse generator 160 is essentially a two pulse sequential pulse generator where the initial pulse of the wave is produced simultaneously with the initial rise of the pulse from the master generator 74. In FIGURE 10, (a) illustrates the wave form from the master generator 74, and (b) illustrates the form of the pulse appearing in the output of the photocells of the photocell assembly 26 which are receiving more than 50% illumination, in other words, a positive output of the photocells which is capable of triggering the storage devices 82. The output pulse from the double pulse generator 160 is illustrated at (c) in FIGURE 10, and this pulse is subtracted from the pulse appearing at the input of the amplifiers 80. The wave at (d) of FIGURE 10 illustrates the wave form which results from the subtraction of the pulse at (c) from that of (b) in FIGURE 10, and it is to be noted that the positive amplitude of this pulse is sufficient to trigger the storage device 82 and that this positive portion occurs only during a limited portion of the period of pulse (a) which contains neither the initial spikes or the decay spikes. In this manner, false triggering as a result of initial or decay spikes appearing on the pulse from the photocells of the assembly 26 due to the interelectrode capacity of the photocells is eliminated. The wave (e) represents the condition wherein the photocells are receiving less than 50 percent illumination, in which case the wave form remains completely below the base, and no triggering occurs.

In the foregoing discussion, it is assumed that the storage means is of the multivibrator type illustrated in FIGURE 6. However, if a storage means of the capacitor type shown in FIGURE 7 is employed, the same results may be obtained by employing a pulse from the double pulse generator 160 which is negative, rather than positive.

If it is desirable to obtain signals from an encoder in sequential form, rather than simultaneous form, it is a considerable simplification to apply the sequential pulses directly to the photocells. FIGURE 11 diagrammatically illustrates an optical encoder having photocells and means to sequentially interrogate the photocells, and the elements which have previously been described bearing the same reference numerals.

A master pulse generator 164 is connected to a sequential pulse generator 168. The master pulse generator 164 may be identical to the pulse generator 74 illustrated in FIGURE 5. The sequential pulse generator 168 is connected to the photocell assembly 26, the terminals 58A, 58B, 58C, 58D, 58E, 58F, 58G, 58H, 58I, 58J, 58K, 58L, 58M, and 58N, being connected to output terminals 170A, 170B, 170C, 170D, 170E, 170F, 170G, 170H, 170I, 170J, 170K, 170L, 170M, and 170N, of the sequential pulse generator 168 by resistors 172A, 172B, 172C, 172D, 172E, 172F, 172G, 172H, 172I, 172J, 172K, 172L, 172M, and 172N. The common terminal 60 of the photocell assembly 26 is connected to an amplifier 174 and to the common ground connector through a resistor 175. The output of the amplifier 174 is connected to a sampler 176, and the sampler 176 is connected to an amplifier 178. The amplifier 178 is connected to a trigger circuit 180, or a flip-flop circuit, and the trigger circuit 180 is connected to a mixing circuit 182. The mixing circuit 182 is connected to a pulse generator 184, and the pulse generator 184 is connected to a storage device 186, the storage device having additional input terminals 187A, 187B, 187C, 187D, 187E, 187F, 187G, 187H, 187I, 187J, 187K, 187L, 187M, and 187N, connected to each of the output terminals 170A, 170B, 170C, 170D, 170E, 170F, 170G, 170H, 170I, 170J, 170K, 170L, 170M, and 170N, respectively, of the sequential pulse generator 168. Having generally illustrated the device, the individual components and their relationship to adjacent components will be described.

FIGURE 12 illustrates the sequential pulse generator 168. The master pulse generator 164 is connected to the base 188 of a transistor 190 of the npn type through a resistor 192 and a capacitor 194 connected in series. The base 188 is also connected to the positive terminal of a power source 196, illustrated in the form of a battery, through serially connected resistors 198 and 200. The negative terminal of the power source 196 is connected to the common ground connector, and the emitter 202 of the transistor 190 is also connected to the ground connector. The collector 204 of the transistor 190 is connected to the positive terminal of the power source 196 through a resistor 206. The collector 204 of the transistor 190 is connected to the electrode 58A of the photocell assembly 26 through a capacitor 208 and the resistor 172A connected in series.

The collector 204 of transistor 190 is also connected to the base 210 of a transistor 212 of the npn type through a capacitor 214. The base 210 of transistor 212 is also connected to the junction of resistors 198 and 200 through a resistor 216. The collector 218 of the transistor 212 is connected to the positive terminal of the power source 196 through resistor 220, and also to the electrodes 58B of the photocell assembly 26 through a capacitor 222 and the resistor 172B connected in series.

In like manner, the sequential pulse generator employs transistor stages connected in cascade with the base of each transistor capacity coupled to the collector of the preceding transistor and coupled through a capacitor and resistor connected in series to one of the electrodes of the photocell assembly 26. For simplification, the first three stages of the sequential pulse generator 168 and the last have been illustrated, the last stage employing a transistor 224 with an emitter 226 connected to the common ground connector. The transistor 224 has a collector 228 connected to the positive terminal of the power source 196 through a resistor 230 and to the photocell electrode 58M through a capacitor 232 and the resistor 172M. In addition, the collector 228 is connected to the ground connector through a capacitor 234 and a diode 236 connected in series to pass positive charges to the ground connector.

The master pulse generator 164 produces positive square wave pulses which are transmitted through the resistor 192 to the capacitor 194. Due to the positive potential upon the base 188 of the transistor 190, the transistor 190 is already fully conducting, and hence the base 188 cannot assume a substantial positive potential in respect to the ground connector. As a result, the capacitor 194 is charged by the pulse from the master pulse generator 164. When the pulse terminates, the base 188 of the transistor 190 assumes a negative potential due to the charge upon the capacitor 194, thus cutting off the flow of current through the transistor 190. The capacitor 194 is charged in a saw-tooth manner by current flowing through the resistor 198 and quickly returns toward ground potential. When the base 188 of transistor 190 first goes negative, the collector 204 gradually assumes a positive potential due to the charging of capacitor 214 through the diode action of the base of transistor 212. When the base 188 of transistor 190 again assumes ground potential, the collector 204 of transistor 190 quickly drops down to approach ground potential again. In this manner, a pulse is generated with a slow rise time and fast decay time, and this pulse is delayed in respect to the pulse from the master pulse generator 164 in that its rise coincides with the decay of the pulse from the master pulse generator 164. This pulse on the collector of transistor 190 is then conducted to the electrode 58A of the photocell assembly 26. In like manner, a pulse is generated by the transistor 212 which is delayed relative to the pulse generated by transistor 190; and each stage of the sequential pulse generator 168 generates a pulse which is delayed relative to the preceding stage, thereby generating a series of pulses responsive to each pulse of the master pulse generator delayed by a unique time interval. The collector of transistor 224, however, is permitted to assume the desired potential by charging capacitor 234 through the diode 236.

Further, as illustraed in FIGURES 11 and 12, the resistors 172A, 172B, 172C, 172D, 172E, 172F, 172G, 172H, 172I, 172J, 172K, 172L, 172M, and 172N, form voltage dividers with resistors 238A, 238B, 238C, 238D, 238E, 238F, 238G, 238H, 238I, 238J, 238K, 238L, 238M, and 238N, connected to the electrodes 58A, 58B, 58C, 58D, 58E, 58F, 58G, 58H, 58I, 58J, 58K, 58L, 58M, and 58N, and the ground connector. These voltage dividers are employed to compensate for inequalities in the photocell sensitivities, and inequalities in the light distribution from the lamp 28.

One of the advantages of pulsing the photocells sequentially is that a single amplifier 174 whose gain is not too critical can be used to amplify the sequence of pulses from the photocell assembly 26. It is often convenient to mount the amplifier, photocell assembly 26, code disc 24, and light source 28 in a common housing, and conduct the necessary electrical signals for the other elements of the encoder from this housing.

The sensitivities of each of the photocells of the photocell assembly 26 is adjusted to a common level by the selection of the voltage dividers designated 172A and 238A, 172B and 238B, 172C and 238C, 172D and 238D, 172E and 238E, 172F and 238F, 172G and 238G, 172H and 238H, 172I and 238I, 172J and 238J, 172K and 238K, 172L and 238L, 172M and 238M, and 172N and 238N, respectively.

Photocell element N is used to compensate for changes in light intensity. To accomplish this, this element is illuminated continuously through a clear track on the disc and receives a sequence of pulses rather than a single pulse. The sequence of pulses is negative and subtracts from the pulses of the other photocell elements. The pulse amplitudes are adjusted so that the resulting pulses are positive when the illumination on the corresponding tracks is greater than 50% of the full illumination and are negative when the illumination is less than 50%. This sequence of negative compensating pulses applied to the photocell electrode 58N is derived from the inverting amplifier 271 which amplifies all the pulses developed across the common load resistor 239. Due to the adjustments necessitated by the non-uniformities of the photocells, the capacitive transients from the photocells A through M will not exactly balance those from cell N, and, therefore, these transients may be either positive or negative in direction, and these capacitive transients are most readily eliminated by means of the sampling circuit 176 which is shown in detail in FIGURE 13.

The amplifier 174 is connected to the amplifier 178 by a capacitor 240, a first diode 242, and a second diode 244 connected in series, the diode 242 being connected to pass positive charges from the junction between the diodes to the amplifier 174 and the diode 244 being connected to pass positive charges from the junction between the diodes to the amplifier 178. A pair of serially connected resistors 246 and 248 are connected between the common ground connector and the junction between the diodes 242 and 244. A resistor 250 is connected between the ground connector and the junction between the capacitor 240 and diode 242, and a resistor 252 is connected between the ground connector and the junction between the amplifier 178 and the diode 244. The sequential pulse generator 168 has a terminal 170-0 which receives a pulse coincident with each pulse of the sequential pulse generator 168, and this terminal 170-0 is connected to the junction between resistors 246 and 248.

The pulse from terminal 170-0 of the sequential pulse generator 168 is of shorter duration than the pulse applied to the photocell assembly 26, and this pulse commences after the pulse on the photocell assembly has substantially achieved its rise and terminates just at the end of the pulse appled to the photocells. As a result, each pulse of the sequential pulse generator 168 is effective to create a pulse in the output of the amplifier 174 which is positive or negative in sign, depending upon whether or not the particular photocell pulsed receives more than 50% illumination, and to create a pulse at the terminal 170-0 which is positive in sign. During the portion of the period of pulsing of the photocell assembly 26 in which there is no sample pulse from the terminal 170-0, very little signal will appear in the input of the amplifier 178 because of the zero-voltage impedance of the diodes being high compared to the resistance of resistor 252. However, during the portion of the pulsing period in which a sample pulse appears on the terminal 170-0, the sample pulse will be transmitted to the amplifier 178 if the signal appearing in the output of the amplifier 174 is positive, but will not be so transmitted if the signal appearing in the output of the amplifier 174 is close to zero or negative. In this manner, the pulses transmitted to the amplifier 178 are free of the capacitive transients and are essentially standardized pulses. The amplifier 178 is then employed to amplify the pulses to suitable amplitudes for triggering the flip-flop circuit 180 which is used to convert the cyclic code on the disc 24 to the straight binary code.

FIGURE 12 illustrates the means for obtaining the sampling pulse on the terminal 170-0 of the sequential pulse generator 168. An amplifier 254 is coupled to the junction between resistor 200 and resistor 198 by capacitor 256. The amplifier 254 is connected to a difference amplifier 258, and a constant direct current source 260 is also connected to the input of the difference amplifier 258. The output of the difference amplifier 258 is connected to a pulse generator 262, and the output of the pulse generator 262 is connected to the terminal 170-0.

The electrical potentials of the bases 188, 210, etc., of the transistors 190, 212, etc., of the sequential pulse generator 168 are in the form of saw-tooth waves, each of the waves being displaced in time from the wave of the preceding stage by an equal interval. As a result, the potential appearing across resistor 200 is in the form of a train of equally displaced saw-tooth waves, since resistance 200 is common to the bases of all of the stages of the sequential pulse generator 168. This train of saw-tooth waves is amplified by the amplifier 254 and the base portion of the amplified waves is subtracted from the waves by the difference amplifier 258 and the constant potential source 260. As a result, the pulse generator 262, which may be in the form of a monostable multivibrator trigger circuit, is triggered by the sharply rising front of each of the pulses emerging from the difference amplifier 258. The output of the pulse generator 262 is a series of pulses, initiated after the pulses from the sequential pulse generator impressed upon the photocell assembly 26 have achieved substantially constant amplitude, occurring at the proper rate and terminating simultaneously with the termination of these pulses impressed upon the photocell assembly 26.

The code disc 24 is coded with the "cyclic binary code," also known as the "cyclic progression code." This code is described by J. J. J. Kernahan in an article entitled, "Digital Code Wheel," in the Bell Laboratory Record. The trigger circuit 180 is triggered by the pulses emerging from the amplifier 178. Also, the trigger circuit is reset by each pulse from the master oscillator 164. The photocells are sequenced in order with the most significant digit being pulsed first with the result that the output of the trigger circuit 180 represents the straight binary code for the shaft position in serial form with the most significant digit occurring first.

The output of the trigger circuit 180 is in the form of one of two relatively long term conditions, and in order to properly excite the storage means 186, it is preferable to break up the output from the trigger circuit 180 into pulses. For this purpose the mixing circuit 182 is employed, and this circuit is illustrated in detail in FIGURE 15. In this circuit 182, a first diode 263 is connected to pass positive charges to the trigger circuit 180 from the pulse generator 184, and a second diode 265 is connected to pass positive charges to the terminal 170N of the sequential pulse generator 168 from the pulse generator 184. The junction between the diodes 263 and 265 is maintained at a positive potential by a resistor 269 and a direct current source, such as battery 267, connected in series between the junction and the common ground terminal. The potential of the junction between the diodes 263 and 265 remains at ground potential unless pulses from the sequential pulse generator and trigger circuit are present at the same time. In this manner, pulses of positive sign within the duration of the pulses of the sequential pulse generator are impressed upon the pulse generator 184.

The positive going edges of these pulses are impressed upon the pulse generator 184 to trigger it. The pulse generator 184 is sufficiently powerful to directly trigger the storage means 186. Suitable devices for the storage means 186 are a magnetic core matrix, or a cathode ray tube, and instructions for the storage means 186 are conveniently provided by connections directly to the output terminals 170A, 170B, 170C, 170D, 170E, 170F, 170G, 170H, 170I, 170J, 170K, 170L, and 170M, of the sequential pulse generator 168, although directions may be obtained in other manners, as will be hereafter described.

As illustrated in FIGURE 12, an inversion amplifier 271 is employed to obtain excitation from the reference photocell which is used to compensate for variations in the intensity of light falling upon the photocell assembly 26. The input terminal of the inversion amplifier 271 is connected to each of the terminals 170A, 170B, 170C, 170D, 170E, 170F, 170G, 170H, 170I, 170J, 170K, 170L, and 170M, of the sequential pulse generator 168 through resistors 273A, 273B, 273C . . . 273M, and a capacitor 275. The output of the inversion amplifier 271 is connected to the terminal 170N through a capacitor 277, and hence to the electrode 58N of the reference photocell. A feedback resistor 279 is connected between the terminal 170N and the junction of the resistors 273A, 273B, 273C, etc. In this manner, each pulse applied to the photocell assembly 26 is conducted to the inversion amplifier 271. The amplifier 271 inverts these pulses and impresses them on the reference photocell to subtract the response thereof from the response of the other cells. Since the reference photocell receives only about half the illumination of the other photocells, the resulting pulse impressed on the amplifier 174 will be positive or negative depending on the illumination received by the other photocells.

The encoder illustrated in FIGURE 14 is a modification of the encoders previously disclosed, particularly the encoder in FIGURE 11. It differs from the encoder in FIGURE 11 principally in that the pulses generated for terminal 170-0 which are employed to activate the sampler 176 are eliminated and a novel sampler, designated 264 is employed. In this encoder, the pulse generator 164, sequential pulse generator 168, photocell assembly 26, and amplifier 174 are identical to those previously described, except that the sequential pulse generator 168 does not include the circuits to generate pulses for the reference photocell which appear on the terminal 170-0.

A multivibrator 266 has an input connected to the master pulse generator 164 and a second input connected to the terminal 170M of the sequential pulse generator 168. The output of the multivibrator 266 is connected to the resistor 172N, and hence to the electrode 58N of the photocell assembly 26. The multivibrator 266 is triggered negatively by each pulse from the master pulse generator 164, and is triggered positively by the trailing edge of the last pulse in each series from the sequential pulse generator, i.e., the pulse appearing on terminal 170M of the sequential pulse generator 168. It is to be noted that this arrangement provides no compensating signal for the capacitive transients although it does eliminate dark current and provide compensation for variations in light intensity. It also assures that at the end of each pulse, the capacitive transient appearing in the output of the amplifier 174 is negative.

The sampling circuit 264 employs, in series, a capacitor 268, a diode 270 connected to pass positive charges from the capacitor 268, and a second capacitor 272. A resistor 274 is connected between the common ground connector and the junction between the capacitor 268 and diode 270. A resistor 276 is connected between the ground connector and the junction between the diode 270 and capacitor 272, and a resistor 278 is connected between the ground connector and the junction between the capacitor 272 and the amplifier 178.

The capacitor 268 removes the direct current component from the output of the amplifier 174, and the diode 270 forms a half-wave rectifier which rectifies the pulses being received. The only time that the output of the half-wave rectifier including the diode 270 has a rapid negative transition is when, at the end of an applied pulse from the sequential pulse generator 168, the output of the amplifier 174 is positive. This occurs only when the pulsed photocell is receiving greater than 50% illumination. The capacitor 272 and resistor 278 differentiate the rectified pulse to produce a negative spike at the input of the amplifier 178.

These negative spikes are amplified by amplifier 178 and may be applied directly to the trigger circuit 180 (or flip-flop circuit). However, for most applications it is preferable to employ the output of the amplifier 178 to excite the pulse generator 280, which then excites the trigger circuit 180.

Since only the very end of the pulses emerging from the photocell assembly 26 is sampled, the capacitive transient at the beginning of each pulse has been permitted to substantially decay. As a result, an encoder constructed in this manner permits the use of narrower pulses than other encoders described herein. Since the permissible speed of the code disc 24 is directly related to the narrowness of the pulses applied to the photocell assembly 26, an encoder constructed in this manner is capable of handling code discs operated at higher rates.

In the construction illustrated in FIGURE 14, there is no convenient source of pulses which may be used in combination with the output of the trigger circuit 180 to produce pulses from the flip-flop signal. It is therefore desirable to employ a storage means which will operate directly from the flip-flop output, and such a means is illustrated in FIGURE 16.

The storage device illustrated in FIGURE 16 is connected to the output of the trigger circuit 180, and there is one storage device for each digit, or photocell, of the encoder connected in parallel to the output of the trigger circuit 180, as will be hereinafter apparent. Each of the storage devices employs two transistors, 282, and 284. The base 286 of transistor 282 is connected to the output of the trigger circuit 180 through a resistor 288, and to the collector 290 of transistor 284 through a resistor 292. The collector 294 of transistor 282 is connected to the positive terminal of a power source 296 through a resistor 298, the negative terminal of the power source 296 being connected to the common ground connector. The emitter 300 of transistor 282 is also directly connected to the common ground connector.

The base 302 of transistor 282 is connected to the collector 294 of transistor 282 through a resistor 304, and the base 302 is also connected to the negative terminal of a power source 306 through resistor 308. A neon bulb 310 is connected in series with a resistor 312 between the negative terminal of power source 306 and the collector 294 of the transistor 282. A relay 314 is connected between the collector 290 of the transistor 284 and the positive terminal of the power source 296, and a diode 316 is connected in parallel with the relay 314 to pass positive charges toward the positive terminal of the power source 296. The master pulse generator 164 is also connected to the base 286 of the transistor 282 through a resistor 318 and capacitor 320 connected in series. The base 286 of each storage device is also connected to one of the terminals 170A, 170B, 170C, etc., of the sequential pulse generator 168 through a capacitor 322 and resistor 324 connected in series.

The storage means has two stable states. During the "zero" state, transistor 282 is conducting, and the neon bulb 310 is extinguished. Also, under these conditions, the transistor 284 is nonconducting and the relay 314 is deenergized. During the "one" state, the transistor 282 is cut off with essentially no base current flowing and its collector at a positive potential to light the neon bulb 310. Under these conditions, the transistor 284 is conducting with its collector 290 close to ground potential causing a current to flow through the relay 314.

At the beginning of each sequence of pulses the master pulse generator 164 resets the trigger circuit 180 to "zero," and it is assumed that under these conditions the output of the trigger circuit 180 is approximately zero volts. It is further assumed that the output of the trigger circuit to indicate "one" is negative, for example minus fifteen volts. Variation of the output of the trigger circuit 180 between these limits will fail to trigger the storage device no matter what state it is in to start with. It is required that a pulse from the master pulse generator 164 or the sequential generator 168 be present coincident with the proper voltage level from the trigger circuit 180 to trigger the storage device under any circumstance. At the beginning of each sequence of pulses, the trigger circuit 180 applies essentially zero potential to the transistor 282 because it is reset by the master pulse generator to this condition. The pulse from the master pulse generator 164 is also effective to reset the storage device to the "zero" condition since it is of sufficient magnitude to cause base current to flow through the transistor 282. In order to set the storage device to the "one" state, the base current through the transistor 282 must drop down nearly to zero. Neither the tail end of the differentiated photocell pulse from the terminal 170M of the sequential pulse generator 168 nor the signal from the trigger circuit 180 alone is sufficient to reduce the base current of the transistor 282 sufficiently to cause it to change state. But when both occur simultaneously, then for an instant of time the base current of transistor 282 drops to zero or below, and the storage device is set to the "one" state. The storage device retains the "one" state until the next pulse from the master pulse generator 164 occurs to reset the storage device. It is thus clear that by employing storage devices of this type, one storage device for each photocell of the encoder, the successive conditions of the trigger circuit 180 are properly sampled and stored.

The encoders previously illustrated require a plurality of connections between the housing 10 and the circuits exterior to the housing 10. For example, the conventional mode of construction for the encoder illustrated in FIGURE 11 is to position the photocell assembly 26, amplifier 174, sampler 176, and amplifier 178 within the housing 10, and to position the master pulse generator 164, sequential pulse generator 168, trigger circuit 180, mixing circuit 182, pulse generator 184, and storage device 186 exterior to the housing 10. As a result, it is necessary to employ at least sixteen connections, or leads, to the housing 10. By placing the sampler 176 and amplifier 178 exterior to the housing 10, the number of leads may be reduced to fifteen. In the encoders illustrated in FIGURES 17, 18 and 19, the number of leads to the housing 10 are reduced to two or three.

Figure 17:
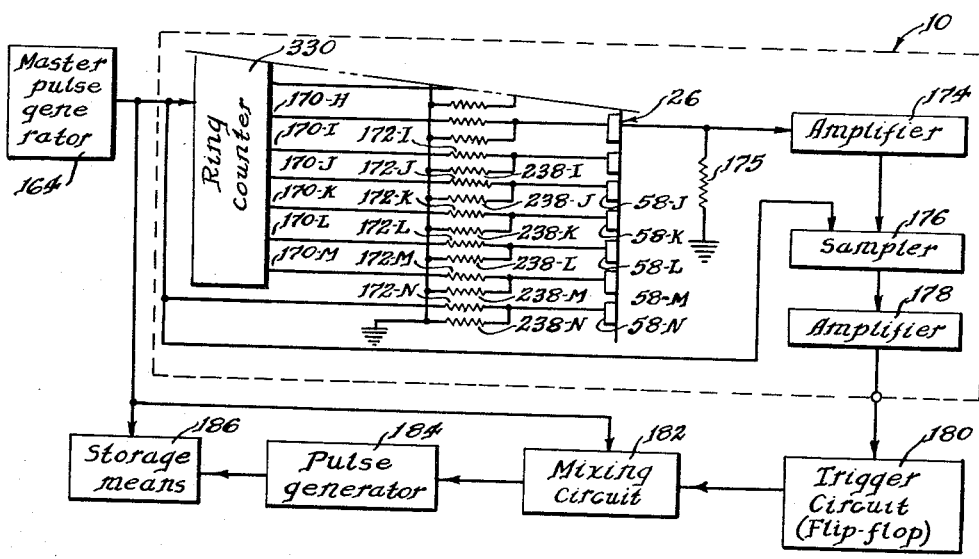

As illustrated in FIGURE 17, the master pulse oscillator 164, trigger circuit 180, mixing circuit 182, pulse generator 184, and storage means 186 remain exterior to the housing 10. The master pulse generator in this case generates a train of thirteen pulses. An input lead from the master pulse generator 164 enters the housing 10 and is connected to a ring counter 330. The ring counter 330 has a stage for each of the photocells in the photocell assembly 26, and responsive to a pulse from the master pulse generator 164 applies a pulse in sequence to one of the photocells of the photocell assembly 26. Ring counters are old in the art and hence will not be described, except to state that a suitable ring counter is disclosed in the patent of R. P. Moore, Jr., et al., No. 2,591,961. The ring counter 330 essentially replaces the sequential pulse generator 168 and is connected to the photocells of the photocell assembly in a manner identical with the connections from the sequential pulse generator illustrated in FIGURE 11, except that the electrode 58N of the reference photocell is connected to the master pulse generator 164 through the resistor 172N.

The sampler 176 also receives its synchronizing pulse directly from the master pulse generator 174, the junction between resistor 246 and resistor 248 of the sampler 176 being connected to the output of the master pulse generator 164. In like manner, the synchronizing pulse to the mixing circuit 182 is obtained directly from the output of the master pulse generator. It is thus to be noted, that single input and output leads are required to the housing.

In FIGURE 18, an encoder is illustrated which employs one input terminal and two output terminals and is similar to the encoder of FIGURE 11 in that a sequential pulse generator 168 is employed to excite the photocell assembly 26. However, the sequential pulse generator 168 is disposed within the housing 10, together with the photocell assembly 26, amplifier 174, sampler 176, and amplifier 178. A lead is brought out through the housing 10 from the terminal 170-0 of the sequential pulse generator 168, and a ring counter 332, similar to the ring counter 330, is employed to provide the instructions for the storage means 186.

In FIGURE 19, an encoder similar to FIGURE 11 is also illustrated in that a sequential pulse generator 168 is employed to drive the photocell assembly 26 from the master oscillator 164. The sequential pulse generator 168, photocell assembly 26, amplifier 174, sampling circuit 176, and amplifier 178 are all disposed within the housing 10. An additional pulse generator 334 is connected to the terminal 170-0 of the sequential pulse generator 168 and generates negative pulses for each pulse generated by the sequential pulse generator 168. The pulse generator 334 is connected to a mixing circuit 336 through a gate circuit 338. The mixing circuit is also connected to the output of the amplifier 178. The pulse generator 334, gate 338, and mixing circuit 336 are all disposed within the housing 10.

The pulse generator 334 generates a negative pulse for each pulse of the sequential pulse generator 168, and this negative pulse is mixed with the output of the amplifier 178 to produce a negative output pulse except when the gate 338 prevents a pulse from passing to the mixing circuit. The gate 338 is actuated by each positive pulse from the amplifier 178 to prevent mixing of the positive pulse and the negative pulse from the pulse generator 334. As a result, each positive pulse from the amplifier 178 appears in the output of the mixer 336, and a negative pulse appears in this output when a positive pulse is not present. In this manner, there is no requirement for an additional lead from the housing 10 to synchronize the equipment exterior to the housing 10.

From the foregoing disclosure, it is apparent that there are many additional modifications and embodiments of the present invention which have not been fully described. For example, two photocell assemblies may be disposed within the housing 10 to simultaneously code positions of the shaft of the encoder into sine and cosine functions, separate outputs being provided for each of the functions. For this reason, it is intended that the scope of the present invention be not limited to the foregoing disclosure but rather only by the appended claims.

The invention claimed is:

1. An encoder comprising, in combination, a plurality of cells having a pair of confronting electrodes and a mass of semiconducting material disposed therebetween, means for establishing one of two values of interelectrode impedance for each of the cells in combinations uniquely correlated with the values of a function to be encoded, a periodic pulse generator connected to one electrode of each cell for generating pulses of short duration compared with the period between the transitions of interelectrode impedance of the cells, a storage means connected to the other electrode of each cell, and means for sampling the information held by the storage means between successive pulses of the pulse generator.

2. An encoder comprising, in combination, a plurality of cells having a pair of confronting electrodes and a mass of semiconductor material disposed therebetween, means for establishing one of two values of interelectrode impedance for each of the cells in combinations uniquely correlated with the values of a function to be encoded, a periodic pulse generator connected to one electrode of each cell for generating pulses of short duration compared with the period between the transitions of interelectrode impedance of the cells, a storage means connected to each of the cells, each of said storage means having one input terminal connected to the other electrode of said cell and a second input terminal for sampling signal, and a sequential pulse generator having one output terminal connected to the second input terminal of each of the storage means and an input terminal connected to the pulse generator, said sequential pulse generator producing a single pulse on each of its output terminals delayed from the last pulse of the pulse generator by a unique time interval and between successive pulses of the pulse generator.

3. An encoder comprising, in combination, a plurality of cells having first and second confronting electrodes and a mass of semiconducting material disposed therebetween, means for establishing one of two values of interelectrode impedance for each of the cells in combinations uniquely correlated with the values of a function to be encoded, a pulse generator connected to the first electrode of each cell for generating pulses of short duration compared with the period between the transitions of interelectrode impedance of the cells, an inversion amplifier having an input terminal connected to the second electrode of one of the cells and an output terminal, an impedance connected between the input and output terminals of said amplifier, a resistor connected between the output terminal of said amplifier and the second electrode of each cell, a storage means having one input terminal connected to the second electrode of each of the other cells and a second input terminal for a sampling signal, and means for sampling the information held by each storage means between successive pulses of the pulse generator connected to the second terminal of each storage means.

4. An encoder comprising, in combination, a housing, a plurality of photocells disposed within the housing on a common axis having first and second confronting electrodes and a mass of light sensitive semiconducting material disposed therebetween, a light source confronting the photocells, a code disc disposed to rotate between the light source and photocells, a pulse generator connected to the first electrode of each photocell, an inversion amplifier having an input connected to the second electrode of one of the cells and an output terminal, an impedance connected between the input and output terminals of said amplifier, a resistor connected between the output terminal of said amplifier and the second electrode of each other cell, a storage means having one input terminal connected to the second electrode of each of the other photocells and a second input terminal for receiving a sampling signal, and means for sampling the information held by each storage means after the lapse of a time interval connected to the second input terminal of each storage means.

5. An encoder comprising, in combination, a housing, a plurality of photocells disposed within the housing on a common plane having first and second confronting electrodes and a mass of light sensitive semiconducting material disposed therebetween, a light source confronting the photocells, a code disc disposed to rotate between the light source and photocells on an axis normally intersecting the common plane of the photocells, a pulse generator connected to the first electrode of each photocell, an inversion amplifier having an input terminal connected to the second electrode of one of the cells and an output terminal, an impedance connected between the input and output terminals of said amplifier, a resistor connected between the output terminal of said amplifier and the second electrode of each cell, a storage means having one input terminal connected to the second electrode of each of the other photocells and a second input terminal for receiving a sampling signal, and a sequential pulse generator having an input terminal connected to the pulse generator and a separate output terminal connected to each of the second input terminals of the storage means, said sequential pulse generator producing in response to each pulse of the pulse generator a single pulse on each of its output terminals delayed from the initiating pulse by a unique time interval.

6. An encoder comprising the elements of claim 2 wherein the sequential pulse generator comprises a plurality of transistors, each transistor having a collector coupled to the second input terminal of one of the storage means, said transistors being connected in cascade by a capacitor connected between the collector of each transistor and the base of the following transistor, the base of the first transistor of said cascade being coupled to the pulse generator, a direct current power source having a negative terminal connected to the emitters of the transistors and a positive terminal, a first resistor connected between the collector of each transistor and the positive terminal of the power source, and a second resistor connected between the base of each transistor and the positive terminal of the power source.

7. An encoder comprising the elements of claim 2 wherein a storage means comprises a first transistor having a base coupled to the other electrode of one of the cells, a collector and an emitter, a direct current power source having a positive terminal and a negative terminal connected to the emitter, a first resistor connected between the collector and the positive terminal of the power source, a second transistor having an emitter connected to the negative terminal of the power source, a base and a collector, the collector of the second transistor being coupled to the sequential pulse generator and coupled to the base of the first transistor, the base of the second transistor being coupled to the collector of the first transistor and to the pulse generator, and a second and a third resistor connected in series between the collector of the second transistor and the positive terminal of the power source.

8. An encoder comprising the elements of claim 3 wherein a storage means coupled to the second electrode of a cell, comprises, in series, a first resistor, a diode connected to pass negative charges from the resistor, and a capacitor, a second resistor connected between one of the output terminals of the sequential pulse generator and the junction between the first resistor and the diode, and positive charging means connected to the junction between the diode and capacitor including a serially connected resistor.

9. An encoder comprising, in combination, a plurality of cells having a pair of confronting electrodes and a mass of semiconducting material disposed therebetween, means adapted to be coupled to a source of signals to be coded for establishing in response to the output of the source of signals one of two values of interelectrode impedance for each of the cells, a pulse generator connected to one electrode of each cell, a gate circuit having a first input terminal, a second input terminal and an output terminal, said first input terminal being coupled to the other electrode of each of the cells, a storage means connected to each gate circuit, each storage means having one input terminal connected to the output terminal of a gate circuit and a second input terminal for a sampling signal, a sequential pulse generator having one output terminal connected to the second input terminal of each storage means and an input terminal connected to the pulse generator, said sequential pulse generator producing a single pulse on each of its output terminals delayed from the last pulse of the pulse generator by a unique time interval, and a delayed pulse generator having an input terminal connected to the pulse generator and an output terminal connected to the second input terminals of the gate circuits, said delayed pulse generator producing a pulse responsive to each pulse of the pulse generator commencing after the pulse from the pulse generator essentially completes its rise and terminating prior to the decay of the pulse from the pulse generator.

10. An encoder comprising, in combination, a plurality of cells having first and second confronting electrodes and a mass of semiconducting material disposed therebetween, means adapted to be coupled to the source of signals to be coded for establishing in response to the output of the signal source one of two values of interelectrode impedance for each of the cells, a pulse generator connected to the first electrode of each cell, an inversion amplifier having an input terminal connected to the second electrode of one of the cells and an output terminal, an impedance connected between the input and output terminals of the inversion amplifier, a resistor connected between the output terminal of the inversion amplifier and the second electrode of each of the other cells, a gate circuit coupled to each of the cells, each of the gate circuits having a first input terminal coupled to the second electrode of a cell, a second input terminal, and an output terminal, a storage means connected to each gate circuit, each storage means having one input terminal connected to the output terminal of one of the gate circuits and a second input terminal for a sampling signal, a sequential pulse generator having one output terminal connected to the second input terminal of each storage means and an input terminal connected to the pulse generator, said sequential pulse generator producing a single pulse on each of its output terminals delayed from the last pulse of the pulse generator by a unique time interval, and a delayed pulse generator having an input terminal connected to the pulse generator and an output terminal connected to the second input terminals of the gate circuits, said delayed pulse generator producing a pulse responsive to each pulse of the pulse generator commencing after the pulse generator essentially completes its rise and terminating prior to the decay of the pulse from the pulse generator.

11. An encoder comprising, in combination, a plurality of cells having first and second confronting electrodes and a mass of semiconducting material disposed therebetween, means adapted to be coupled to the source of signals to be coded for establishing in response to the output of the signal source one of two values of interelectrode impedance for each of the cells, a pulse generator connected to the first electrode of each cell, an inversion amplifier having an input terminal connected to the second electrode of one of the cells and an output terminal, an impedance connected between the input and the output terminals of the inversion amplifier, a resistor connected between the output terminal of the inversion amplifier and the second electrode of each of the other cells, a storage means connected to each of the other cells, each storage means having one input terminal connected to the second electrode of one cell and a second input terminal for a sampling signal, and a double pulse generator having an input terminal connected to the pulse generator and an output terminal connected to the input of the inversion amplifier, said double pulse generator producing in response to each pulse from the pulse generator a pair of pulses separated by a fixed time interval which occurs during a period after the pulse from the pulse generator completes its rise and prior to the decay of said pulse from the pulse generator.

12. An encoder comprising, in combination, a housing, a plurality of photocells disposed within the housing on a common plane having first and second confronting electrodes and a mass of light sensitive semiconducting material disposed therebetween, a light source confronting the photocells, a code disc disposed to rotate between the light source and the photocells on an axis normally intersecting the common plane of the photocells, a pulse generator connected to the first electrode of each photocell, an inversion amplifier having an input connected to the second electrode of one of the cells and an output terminal, an impedance connected between the input and output terminals of the inversion amplifier, a resistor connected between the output terminal of said amplifier and the second electrode of each cell, a storage means having one input terminal connected to the second electrode of each of the other photocells and a second input terminal for receiving a sampling signal, means for sampling the information held by each storage means after the lapse of a time interval connected to the second input terminal of each storage means, a double pulse generator having an input terminal connected to the pulse generator and an output terminal coupled to the input terminal of the inversion amplifier, said double pulse generator generating a pair of pulses responsive to a pulse from the pulse generator separated by a time interval which occurs after each pulse from the pulse generator essentially completes its rise and terminates prior to the decay of each pulse from the pulse generator.

13. An encoder comprising, in combination, a plurality of cells having first and second confronting electrodes and a mass of semiconducting material disposed therebetween, means adapted to be coupled to the source of signals to be coded for establishing in response to the output of the source of signals one of two values of interelectrode impedance for each of the cells, a sequential pulse generator having a plurality of output terminals and an input terminal, one output terminal being connected to the first electrode of each of the cells, and a pulse generator connected to the input terminal of the sequential pulse generator.

14. An encoder comprising, in combination, a plurality of cells having a pair of confronting electrodes and a mass of semiconducting material disposed therebetween, means adapted to be coupled to the source of signals to be coded for establishing in response to the output of the source of signals one of two values of interelectrode impedance for each of the cells, means to sequentially impress a pulse upon one of the electrodes of each of the cells, and a storage device having an input terminal connected to the other electrode of each of the cells.

15. An encoder comprising, in combination, a plurality of cells having a pair of confronting electrodes and a mass of semiconducting material disposed therebetween, means adapted to be coupled to the source of signals to be coded for establishing in response to the output of the source of signals one of two values of interelectrode impedance for each of the cells, a sequential pulse generator having a plurality of output terminals and an input terminal, one of the output terminals being connected to one of the electrodes of each of the cells, said sequential pulse generator comprising a plurality of cascaded stages including a transistor having a base, emitter, and collector, the base of the transistor in the transistor in the first stage being coupled to the pulse generator and the bases of each subsequent stage being coupled to the collector of the transistor in the preceding stage, a direct current power source having a positive terminal and a negative terminal connected to the emitter of each transistor, a resistor connected to the collector of each transistor and to the positive terminal of the power source.

16. An encoder comprising, in combination, a housing, a plurality of photocells disposed within the housing on a common plane having a pair of confronting electrodes and a mass of semiconducting material disposed therebetween, a light source confronting the photocells, a code disc disposed to rotate between the light source and photocells on a plane normally intersecting the common axis of the photocells, a sequential pulse generator having a plurality of output terminals and an input terminal, one output terminal being connected to one electrode of each of the photocells, a pulse generator connected to the input terminal of the sequential pulse generator, and a trigger circuit having an input terminal connected to the other electrode of each of the photocells and a second input terminal connected to the master pulse generator, whereby the master pulse generator resets the trigger circuit with each pulse thereof.

17. An encoder comprising, in combination, a plurality of cells having first and second confronting electrodes and a mass of semiconducting material disposed therebetween, means adapted to be coupled to the source of signals to be coded for establishing in response to the output of the source of signals one of two values of interelectrode impedance for each of the cells, a sequential pulse generator having a plurality of output terminals and an input terminal, a pulse generator connected to the input terminal of the sequential pulse generator, the first of said output terminals producing an output pulse simultaneously with the pulse on each of the other output terminals, and the pulses to the other output terminals occurring in sequence, each of said other output terminals being connected to the first electrode of a cell, a sampler having two input terminals, one of said input terminals being connected to the second electrode of each of the cells, and the other input terminal of the sampler being connected to the first output terminal of the sequential pulse generator.

18. An encoder comprising the elements of claim 13 in combination with a storage device having one signal input terminal and a plurality of instruction input terminals, the signal input terminal being connected to the second electrode of each of the cells, and each of the instruction input terminals being connected to one of the output terminals of the sequential pulse generator.

19. An encoder comprising, in combination, a plurality of cells having first and second confronting electrodes and a mass of semiconducting material disposed therebetween, means adapted to be coupled to the source of signals to be coded for establishing in response to the output of the source of signals one of two values of interelectrode impedance for each of the cells, a pulse generator, a multivibrator having two input terminals and an output terminal, one of the input terminals being connected to the pulse generator, and the output terminal being connected to the first electrode of one of the cells, and a sequential pulse generator having an input terminal connected to the pulse generator and a plurality of output terminals, one of said output terminals being connected to the first electrode of each of the other cells, said sequential pulse generator producing a series of sequential pulses on its output terminals, and the second input terminal of the multivibrator being connected to the output terminal of the sequential pulse generator receiving the last pulse in each series.

20. An encoder comprising the elements of claim 19 in combination with a sampler having an input terminal connected to the second terminal of each of the other cells, said sampler including, in cascade, a capacitor, a rectifier, and a differentiator.

21. An encoder comprising the elements of claim 20 in combination with a flip-flop circuit connected to the output of the sampler, and a plurality of storage circuits connected to the output of the flip-flop circit, each of said storage circuits being connected to one of the outputs of the sequential pulse generator and including a pair of transistors having a base, a collector, and an emitter, the base of the first of said transistors being coupled to the flip-flop circuit, the pulse generator, and one of the output terminals of the sequential pulse generator, a source of direct current potential having a negative terminal connected to the emitters of the transistors and a positive terminal, a first resistor connected between the collector of the first transistor and the positive terminal, a second resistor connected between the base of the second transistor and the collector of the first transistor, a relay connected between the collector of the second transistor and the positive terminal of the power source, a diode connected in parallel with the relay to pass positive charges to the power source, a second direct current power source having a positive terminal connected to the negative terminal of the first power source and a negative terminal connected to the base of the second transistor, and a neon tube connected between the collector of the first transistor and the negative terminal of the second power source.

22. An encoder comprising, in combination, a plurality of cells having first and second confronting electrodes and a mass of semiconducting material disposed therebetween, means adapted to be coupled to the source of signals to be coded for establishing in response to the output of the source of signals one of two values of interelectrode impedance for each of the cells, a pulse generator connected to the first electrode of one of the cells, a ring counter having an input terminal connected to the pulse generator and a plurality of output terminals, one of said output terminals being connected to the first electrodes of the other cells, a sampler having an input terminal connected to the second electrode of each of the cells and a second input terminal connected to the pulse generator.

23. An encoder comprising, in combination, a plurality of cells having first and second confronting electrodes and a mass of semiconducting material disposed therebetween, means adapted to be coupled to the source of signals to be coded for establishing in response to the output of the source of signals one of two values of interelectrode impedance for each of the cells, a sequential pulse generator having a plurality of output terminals and an input terminal, one of said output terminals receiving a pulse simultaneously with the pulse on each of the other output terminals and the pulses on the other output terminals occurring sequentially, a ring counter having an input terminal connected to the first output terminal of the sequential pulse generator, the other output terminals of the sequential pulse generator being connected to the first electrode of each cell, a sampler having one input terminal connected to the second terminal of each of the cells and a second input terminal connected to the first output terminal of the sequential pulse generator, a trigger circuit connected to the output terminal of the sampler, and a storage device having an input terminal connected to the output terminal of the trigger circuit and a plurality of instruction input terminals connected to the output terminals of the ring counter.

24. An encoder comprising, in combination, a plurality of cells having first and second confronting electrodes and a mass of semiconducting material disposed therebetween, means adapted to be coupled to the source of signals to be coded for establishing in response to the output of the source of signals one of two values of interelectrode impedance for each of the cells, a sequential pulse generator having a plurality of output terminals, the first of said output terminals receiving a pulse simultaneously with the pulse to each of the other output terminals and the other output terminals receiving pulses sequentially, a pulse generator connected to the first of said output terminals of the sequential pulse generator, the other output terminals of the sequential pulse generator being connected to the first electrode of each of the cells, a sampler having two input terminals and an output terminal, one of the input terminals of the sampler being connected to the second electrode of each of the cells and the second input terminal of the sampler being connected to the first output terminal of the sequential pulse generator, a mixing circuit having a first input terminal, a second input terminal, and an output terminal, the first input terminal being connected to the output terminal of the sampler and a second input terminal, a gate circuit having a first input terminal connected to the output terminal of the pulse generator and a second input terminal connected to the output terminal of the sampler, and said gate circuit having an output terminal connected to the second input terminal of the mixing circuit.

25. An encoder comprising, in combination, a plurality of cells having a pair of confronting electrodes and a mass of semiconductor material disposed therebetween, means for establishing one of two values of interelectrode impedance for each of the cells in combinations uniquely correlated with the values of a function to be encoded, means for periodically generating an indication of the interelectrode impedance of each cell comprising a plurality of storage means electrically connected respectively to said cells, each storage means being responsive to the interelectrode impedance of the cell connected thereto, and a sequential pulse generator having a plurality of output terminals respectively connected to the plurality of storage means, a different output terminal being electrically connected to each storage means, the sequential pulse generator periodically producing a series of pulses on its output terminals, the pulse on each output terminal appearing at a different time than the pulses on the other output terminals.

26. An encoder comprising the elements of claim 25 in combination with means for periodically and simultaneously impressing the interelectrode impedance of each cell on each storage means, each series of pulses of the sequential pulse generator following in time an impressing of the interelectrode impedance on the storage means.

27. An encoder comprising, in combination, a plurality of light responsive cells, means for establishing one of two electrical responses for each cell in combinations uniquely correlated with the values of a function to be encoded including a light source of substantially constant amplitude and a code member disposed between the cells and the light source, means electrically connected to each of the cells for periodically sampling each of the cells to determine which electrical response each of the cells has made within a period of short duration compared to the period between transitions between electrical responses of the cells including a periodic pulse generator, a storage means connected to each of the cells, each of said storage means being responsive to only one of the electrical responses of said cell and having one input terminal connected to said cell and a second input terminal for a sampling signal, and a sequential pulse generator having one output terminal connected to the second input terminal of each of the storage means and an input terminal connected to the pulse generator, said sequential pulse generator producing a single pulse on each of its output terminals delayed from the last pulse of the pulse generator by a unique time interval and between successive pulses from the pulse generator.

28. An encoder comprising, in combination, a plurality of light responsive cells, means for establishing one of two electrical responses for each cell in combinations uniquely correlated with the values of a function to be encoded including a light source and a code member disposed between the cells and the light source, and means electrically connected to each of the cells for periodically sampling each of the cells to determine which electrical response each cell has made including a sequential pulse generator having a plurality of output terminals respectively connected to the plurality of cells, a different output terminal being coupled to each of the cells and said sequential pulse generator generating a single pulse on each of the output terminals thereof within a period of short duration compared to the period between transitions between electrical responses of the cells.

29. An encoder comprising, in combination, a plurality of cells having a light responsive electrical characteristic, means for establishing one of two electrical responses for each cell in combinations uniquely correlated with the values of a function to be encoded including a light source and a code member disposed between the cells and the light source, whereby movement of the code member alternately illuminates and darkens each cell, a different means independent of the light source for limiting the period of said response including an electrical pulse generator electrically coupled to each cell for generating electrical pulses of shorter duration than the period of the illumination of the cells, and an electrically responsive means electrically coupled to each cell, said electrically responsive means responding only during the period of a pulse from the pulse generator and to only one of the electrical responses of the cells.

References Cited in the file of this patent

UNITED STATES PATENTS

| | | |
|---|---|---|
| 2,575,342 | Gridley | Nov. 20, 1951 |
| 2,582,850 | Rose | Jan. 15, 1952 |
| 2,594,514 | Sweet | Apr. 29, 1952 |
| 2,651,728 | Wood | Sept. 8, 1953 |
| 2,655,609 | Shockley | Oct. 13, 1953 |
| 2,679,644 | Lippel | May 25, 1954 |
| 2,686,632 | Wilkinson | Aug. 17, 1954 |
| 2,714,204 | Lippel | July 26, 1955 |
| 2,750,584 | Goldfischer | June 12, 1956 |
| 2,778,978 | Drew | Jan. 22, 1957 |
| 2,790,088 | Shive | Apr. 23, 1957 |

OTHER REFERENCES

Shive, Follingstag: "Optical Position Encoder," Proc. Nat'l. Electronics Conference, 1952, pp. 766–775.